(12) United States Patent
Sarikhani

(10) Patent No.: US 12,040,664 B2
(45) Date of Patent: *Jul. 16, 2024

(54) ELECTRIC WINDING EXCHANGER SYSTEM FOR A MULTI-PHASE ELECTRIC MOTOR WITH MULTIPLE ISOLATED NEUTRALS AND MULTIPLE COIL PATHS

(71) Applicant: Ali Sarikhani, Mission Viejo, CA (US)

(72) Inventor: Ali Sarikhani, Mission Viejo, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 17/883,003

(22) Filed: Aug. 8, 2022

(65) Prior Publication Data

US 2023/0283151 A1    Sep. 7, 2023

Related U.S. Application Data

(60) Provisional application No. 63/316,212, filed on Mar. 3, 2022.

(51) Int. Cl.
| | | |
|---|---|---|
| *H02K 3/00* | (2006.01) | |
| *H02K 5/22* | (2006.01) | |
| *H02K 11/30* | (2016.01) | |
| *H02P 9/00* | (2006.01) | |

(52) U.S. Cl.
CPC .............. *H02K 11/30* (2016.01); *H02K 3/00* (2013.01); *H02K 5/225* (2013.01)

(58) Field of Classification Search
CPC .. H02K 3/00; H02K 3/28; H02K 5/00; H02K 5/22; H02K 5/225; H02K 11/00; H02K 11/30; H02K 11/33; H02P 6/00; H02P 6/18; H02P 6/182; H02P 25/00; H02P 25/18; H02P 25/182; H02P 9/00; H02P 9/02

See application file for complete search history.

(56) References Cited

U.S. PATENT DOCUMENTS

| | | | |
|---|---|---|---|
| 11,088,642 B2 * | 8/2021 | Sarikhani | .................. H02P 9/02 |
| 2004/0131342 A1 | 7/2004 | Masino | |
| 2005/0206263 A1 | 9/2005 | Cai et al. | |
| 2007/0018598 A1 | 1/2007 | Nichols | |
| 2009/0128071 A1 | 5/2009 | Brown | |

FOREIGN PATENT DOCUMENTS

EP            0123807 B1    10/1988

* cited by examiner

*Primary Examiner* — Tran N Nguyen

(57) ABSTRACT

An electric winding exchanger system for a multi-phase electric motor with multiple isolated neutrals and multiple coil paths increases torque or speed performance of multi-phase electric motors and electric drive modules. The system includes an electronic control unit, a back electromotive force (EMF) boosting circuit, a plurality of high-voltage terminals, an electric motor, and a motor control unit. The electronic control unit receives and processes commands from the motor control unit. The back EMF boosting circuit adjusts the winding arrangements of the electric motor in order to change the state of the electric motor. The plurality of high-voltage terminals transfers high voltage electrical energy from the back EMF boosting circuit to the electric motor and vice versa. The motor control unit allows a user to input commands in order to activate increased torque or speed performance for the electric motor. The electric motor is preferably a multi-phase electric motor of an electric or hybrid vehicle.

20 Claims, 12 Drawing Sheets

ELECTRIC WINDING EXCHANGER SYSTEM FOR A MULTI-PHASE ELECTRIC MOTOR WITH MULTIPLE ISOLATED NEUTRALS AND MULTIPLE COIL PATHS

FIELD OF THE INVENTION

The present invention relates generally to the field of electric motors and more specifically to the field of electric winder exchanger systems for a multi-phase electric motor with multiple isolated neutrals and multiple coil paths.

BACKGROUND OF THE INVENTION

The first basic boundary of a multi-phase motor-controller-battery is the boundary of maximum electrical motor torque for specified duration (for example: lower than 10 seconds) from low to medium speed which is mainly due to the limits of controller and battery current rated values for specified duration and to the limit of motor maximum torque for specified volume. The second basic boundary of multi-phase motor-controller-battery is maximum electrical motor speed for any duration which is mainly due to the limit of battery voltage value.

It is very desirable to exceed beyond above mentioned torque and speed boundaries without changing the motor volume, the current of controller and the voltage of the battery. This present invention provides an electric winding exchanger system for a multi-phase electric motor with multiple isolated neutrals and multiple coil paths (hereinafter electric winding exchanger system) to overcome the limits and go beyond the boundaries. The electric winding exchanger system is designed as a new hardware-software device for use in electric drive modules of electric vehicles, plug in hybrid electric vehicles, and hybrid electric vehicles. The electric winding exchanger system is a controllable device from vehicle or controller. Controlling and exchanging to the optimal configuration of electric winding of motor is the method for overcoming the limits and going above torque and speed boundaries. Other desirable features and characteristics of the present disclosure will become apparent from the subsequent detailed description and the appended claims, taken in conjunction with the accompanying drawings and this background discussion.

SUMMARY OF THE INVENTION

In one embodiment, the location of the electric winding exchanger is disclosed for an electric motor-controller-battery system. The electric motor-controller-battery system defines the base system. The electric motor-controller-battery system includes a n-phase electric motor, a n-phase motor control unit, and a high-voltage battery system integrated and characterized inside the vehicle. The electric motor-controller-battery system also includes a n-phase cable between motor and controller. The system includes a DC cable between controller and battery. The system also includes electric motor terminal block. The electric winding exchanger system is physically located between a multi-phase motor and a multi-phase motor control unit. The system may structurally be integrated with the multi-phase electric motor housing. High-voltage circuits of the electric winding exchanger system is connected to the electric motor from one side and form the other side to the motor control unit.

The operation states of the electric winding exchanger system are disclosed. Operation modes include high speed, high torque, transient, and off.

A principle of operation of the electric winding exchanger system is disclosed. The system includes the principle of operation for overcoming the boundaries of torque and speed without increasing the limits of the motor control unit, the battery current, electric motor peak torque, and/or the battery voltage.

DETAIL DESCRIPTIONS OF THE INVENTION

All illustrations of the drawings are for the purpose of describing selected versions of the present invention and are not intended to limit the scope of the present invention.

The present invention may be used in traction motors which have multiple neutrals, such as those used in electrical vehicles. The electric winding exchanger system produces multiple discrete transient torque shifts for the system. The present invention may allow for state changes of controlled switches, eliminating the need for high speed insulated gate bipolar transistors (IGBT), silicon carbide (SIC) metal-oxide-semiconductor field-effect transistors (MOSFETS), gallium nitride (GaN) field effect transistors, and triodes for alternating current (TRIAC), thus eliminating the need for a forced cooling system. A properly controlled switches state change eliminates the need for alternating current capacitors. Snubber circuits are not required, and electrical sparks and over-voltage transients are eliminated, thus enhancing the life of controlled switch contacts. An electromechanical relay system of the present invention is a cost-effective design.

Figure 1:
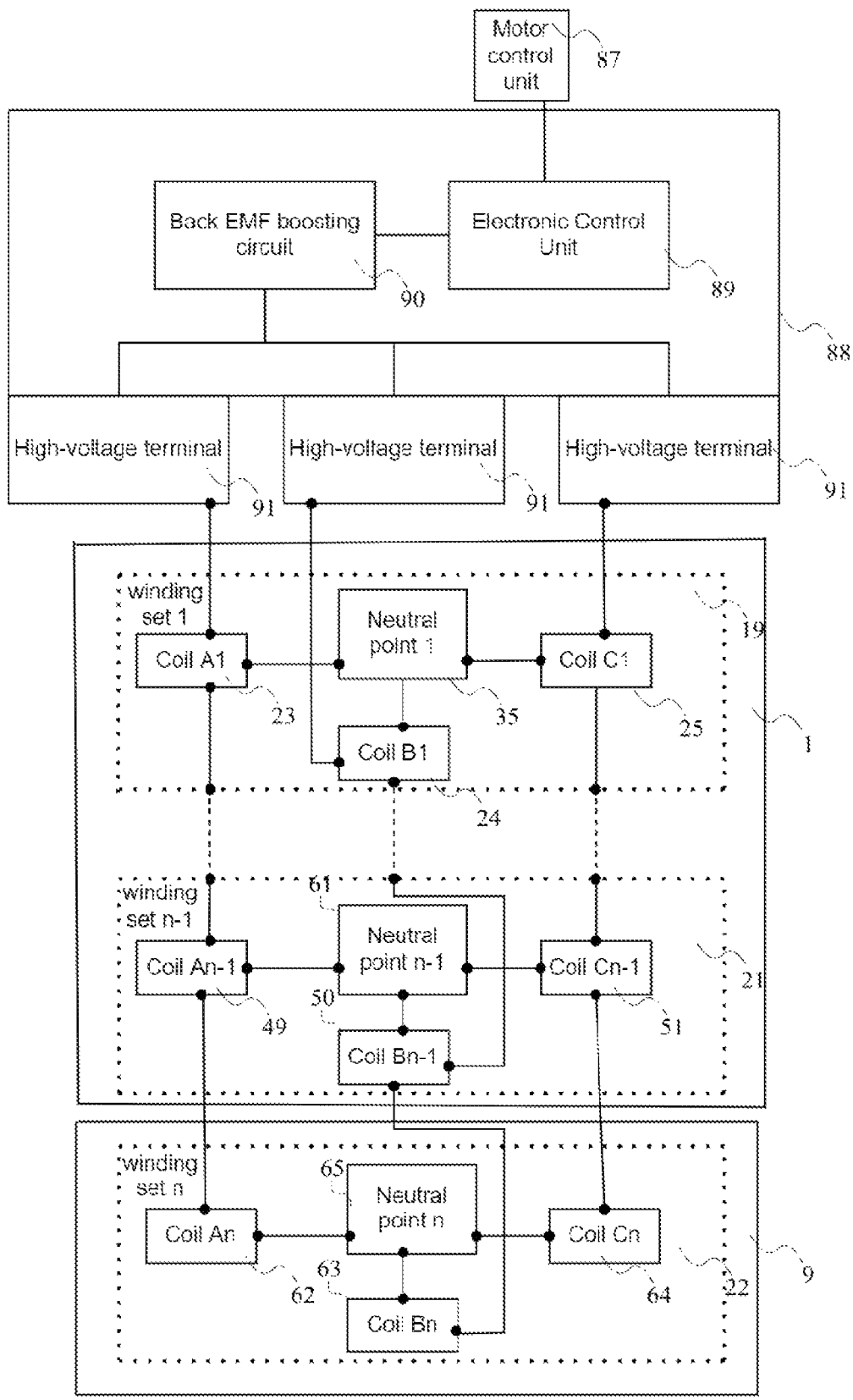
FIG. 1 is a schematic diagram illustrating the overall system of the present invention.

A preferred embodiment of the present invention is shown in FIG. 1 and comprises an electronic control unit 89, a back electromotive force (EMF) boosting circuit 90, a plurality of high-voltage terminals 91, an electric motor 9, a winding exchanger system 1, and a motor control unit 87. The electronic control unit 89 receives and processes commands from the motor control unit 87. The back EMF boosting circuit 90 adjusts the winding arrangements of the winding exchanger system 1 in order to change the state of the electric motor 9. The plurality of high-voltage terminals 91 transfers high-voltage electrical energy from the back EMF boosting circuit 90 to the winding exchanger system 1 and the electric motor 9 and vice versa. The motor control unit 87 allows a user to input commands in order to activate increased torque or speed performance for the winding exchanger system 1 and the electric motor 9.

The general configuration of the aforementioned components allows the present invention to increase torque or speed performance of multi-phase electric motors and electric drive modules. With reference to FIG. 1, the electric motor 9 comprises a plurality of winding sets, winding set 1 19, winding set n–1 21, and motor 9. The 3-phase electric winding exchanger system may include "n" equal balanced coils sets per phase (Np=n) with N number of neutrals in the 3-phase electric winding exchanger system. Further, the electric winding exchanger system and the inverter may include an equal number of terminals on an inverter side of the electric winding exchanger system. For example, for a 3-phase system, each of the electric winding exchanger system, the multi-phase motor, and the inverter may include 3 terminals. Winding set 1 19 comprises coil A1 23, coil B1 24, and coil C1 25. Winding set 1 19 further comprises neutral point 1 35. Winding set n–1 21 comprises coil An–1 49, coil Bn–1 50, and coil Cn–1 51. Winding set n–1 21 further comprises neutral point n–1 61. Motor 9 comprises coil An 62, coil Bn 63, and coil Cn 64. Winding set n–1 21 further comprises neutral point n 65. The motor control unit 87 is electrically connected to the electronic control unit 89. This allows commands to be relayed from the motor control unit 87 and to the electronic control unit 89. The electronic control unit 89 is electrically connected to the back EMF boosting circuit 90. This allows the electronic control unit 89 to manage the back EMF boosting circuit 90. The winding exchanger system 1 is configured to operate through a plurality of electrical phases. Each of the plurality of electrical phases is associated to a corresponding high-voltage terminal from the plurality of high-voltage terminals 91 and a corresponding coil from the plurality of coils. The neutral points 35, 61, 65 are selectively and electrically connected to each of the plurality of coils. This is explored in further detail in FIG. 5A and FIG. 5B. The corresponding coil is selectively and electrically connected to the back EMF boosting circuit 90 by the corresponding high-voltage terminal. In further detail, the corresponding coil can be electrically powered by the back EMF boosting circuit 90 via the corresponding high-voltage terminal 91. Coil A1 23 is electrically connected to a high-voltage terminal 91 and . . . to Coil An–1 49. Coil An–1 49 is electrically connected to Coil An 62. Coil B1 24 is electrically connected to a high-voltage terminal 91 and . . . to Coil Bn–1 50. Coil Bn–1 50 is electrically connected to Coil Bn 63. Coil C1 25 is electrically connected to a high-voltage terminal 91 and . . . to Coil Cn–1 51. Coil Cn–1 51 is electrically connected to Coil Cn 64. Neutral point 1 35, . . . Neutral point n–1 61, Neutral point n 65 may be isolated neutral points. In further detail, electrical energy can be transferred from one coil to another coil. Thus, the electrical phases can be adjusted by adjusting the electrical connections between the corresponding coils for each winding set, the electrical connections between the corresponding coil and the corresponding high-voltage terminal, and the electrical connections between the neutral points and each of the plurality of coils. Dependent of the adjustments to the electrical phases, improved torque or speed performance can be outputted by the electrical motor.

Figure 2:
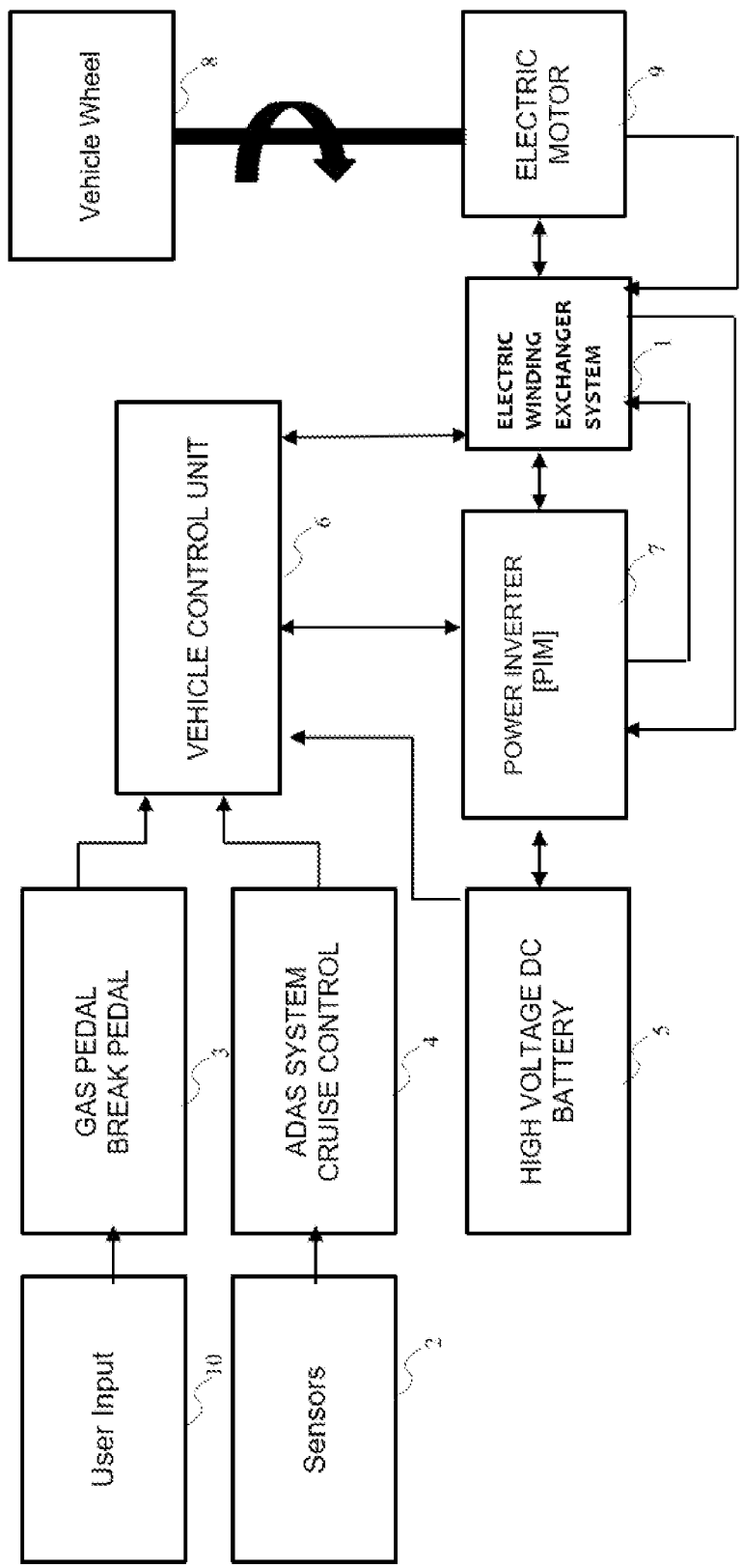
FIG. 2 is a schematic of an electric winding exchanger system in a vehicle system.

The present invention is responsible for physical reconfiguration of a motor coil's polarities while keeping the neutrals electrically isolated. FIG. 2 shows an overview of the electric winding exchanger system for a multi-phase electrical motor with multiple neutrals and multiple coil paths inside an electric vehicle. User input 10 comes into the system by the user depressing a gas pedal or brake pedal 3, which is processed by the vehicle control unit 6. Input can also come from sensors 2 and an advanced driver assist system (ADAS) cruise control 4. This is also processed by the vehicle control unit 6. A high-voltage direct current (DC) battery 5 powers the vehicle control unit 6 and sends and receives power from the power inverter module (PIM) 7. The PIM 7 sends and receives power and signals from the Electric Winding Exchanger System 1. The Electric Winding Exchanger System 1 operates on an electric motor 9 to turn the vehicle wheel 8.

Figure 3:
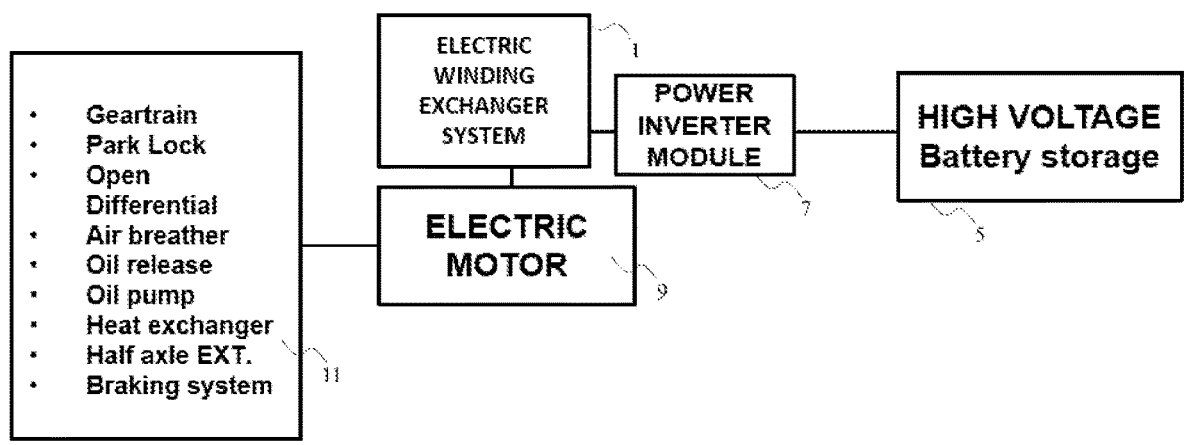
FIG. 3 is a schematic of an electric winding exchanger system integrated into an electric vehicle electric drive unit.

FIG. 3 shows a detailed view of how the Electric Winding Exchanger System 1 for a multi-phase electrical motor with multiple neutrals and multiple coil paths works in an electric vehicle. High-voltage battery storage 5 goes through a power inverter module 7 to power the electric winding exchanger system 1 and ultimately the electric motor 9. The electric motor 9 operates on the vehicle subsystems 11 including the geartrain, park lock, open differential, air breather, oil release, oil pump, heat exchanger, half axle extension, and the braking system.

Figure 4:
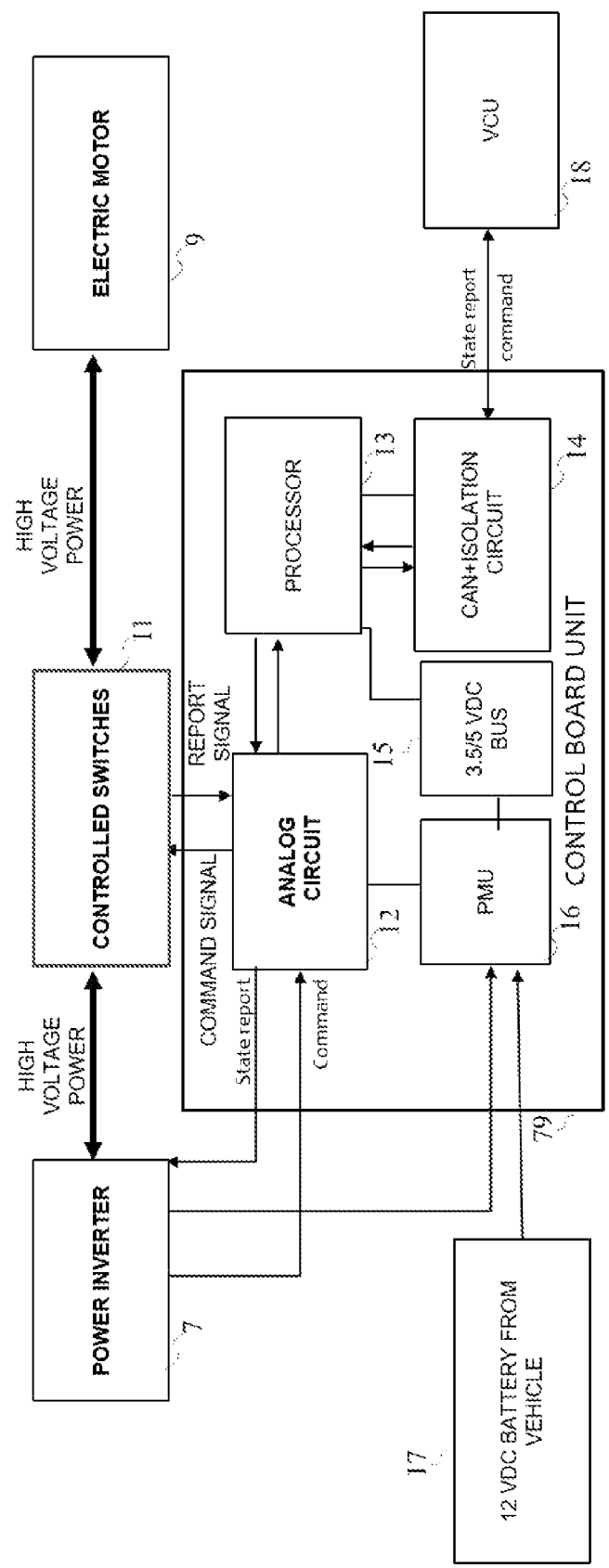
FIG. 4 is a control board unit for controlled switches.

FIG. 4 shows a detailed view of a control board unit 79 for controlled switches 11. The control board unit 79 contains an analog circuit 12 which receives an analog command directly from the power inverter module 7 then it amplifies the command using an amplifier circuit. The analog circuit 12 then applies the amplified command on controlled switches 11 in the form of voltage by using an excitation circuit. The analog circuit 12 is also responsible for collecting the state of the controlled switches 11, insulating the state, and sending the state back to the power inverter module 7. A Power management unit (PMU) 16 is responsible for generating isolated voltage for a processor and the analog circuit. The PMU receives 12 Volt direct current from the vehicle battery. The isolated voltage goes through a 3.5/5 Volt direct current bus 15 to the processor 13. The control board unit also comprises a controlled area network and isolation circuit 14 which receives and sends state reports and commands to and from the vehicle control unit (VCU) 18. A power inverter 7 receives state reports and sends commands to the analog circuit 12. The analog circuit 12 sends command signals and receives report signals from controlled switches 11. High-voltage power is transmitted to and from the controlled switches 11 and the electric motor 9.

Figure 5A:
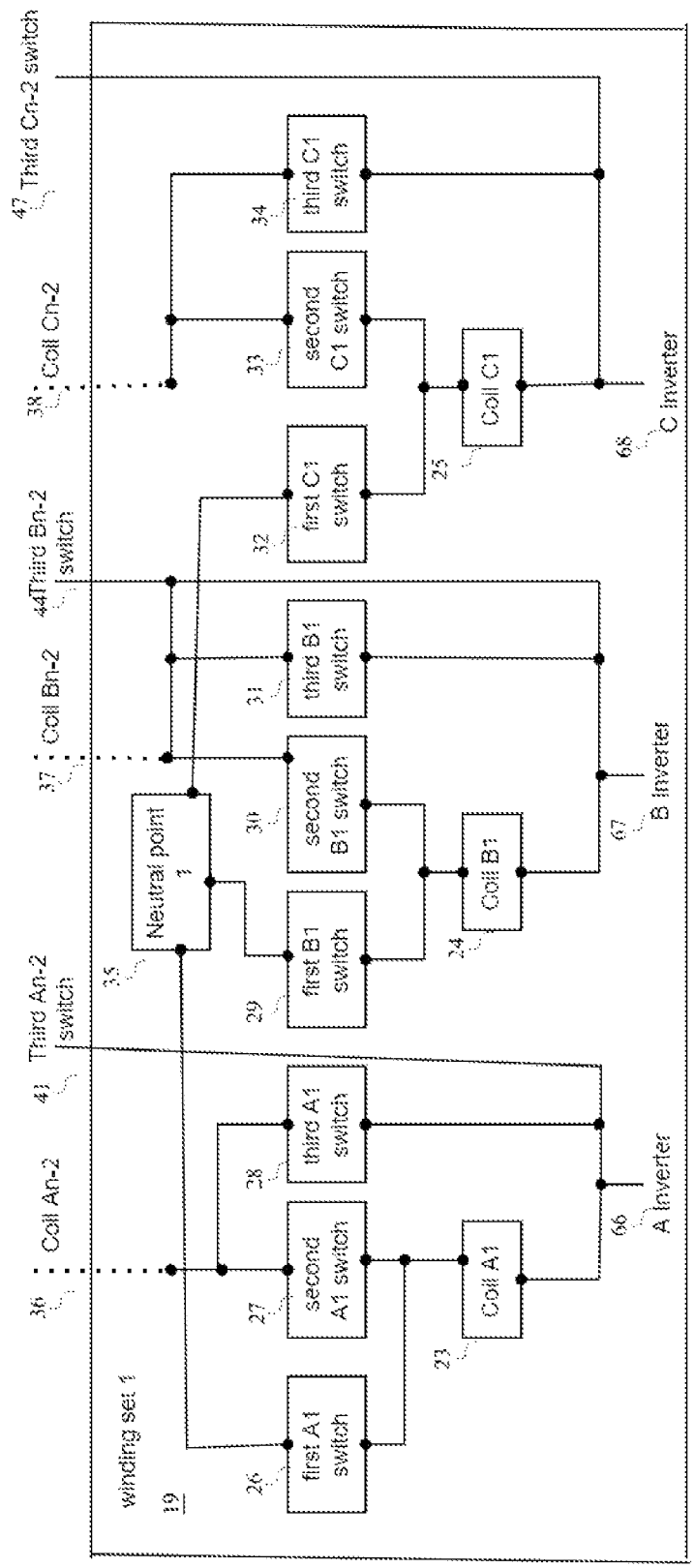
FIG. 5A is a schematic of an electric winding exchanger system.
Figure 5B:
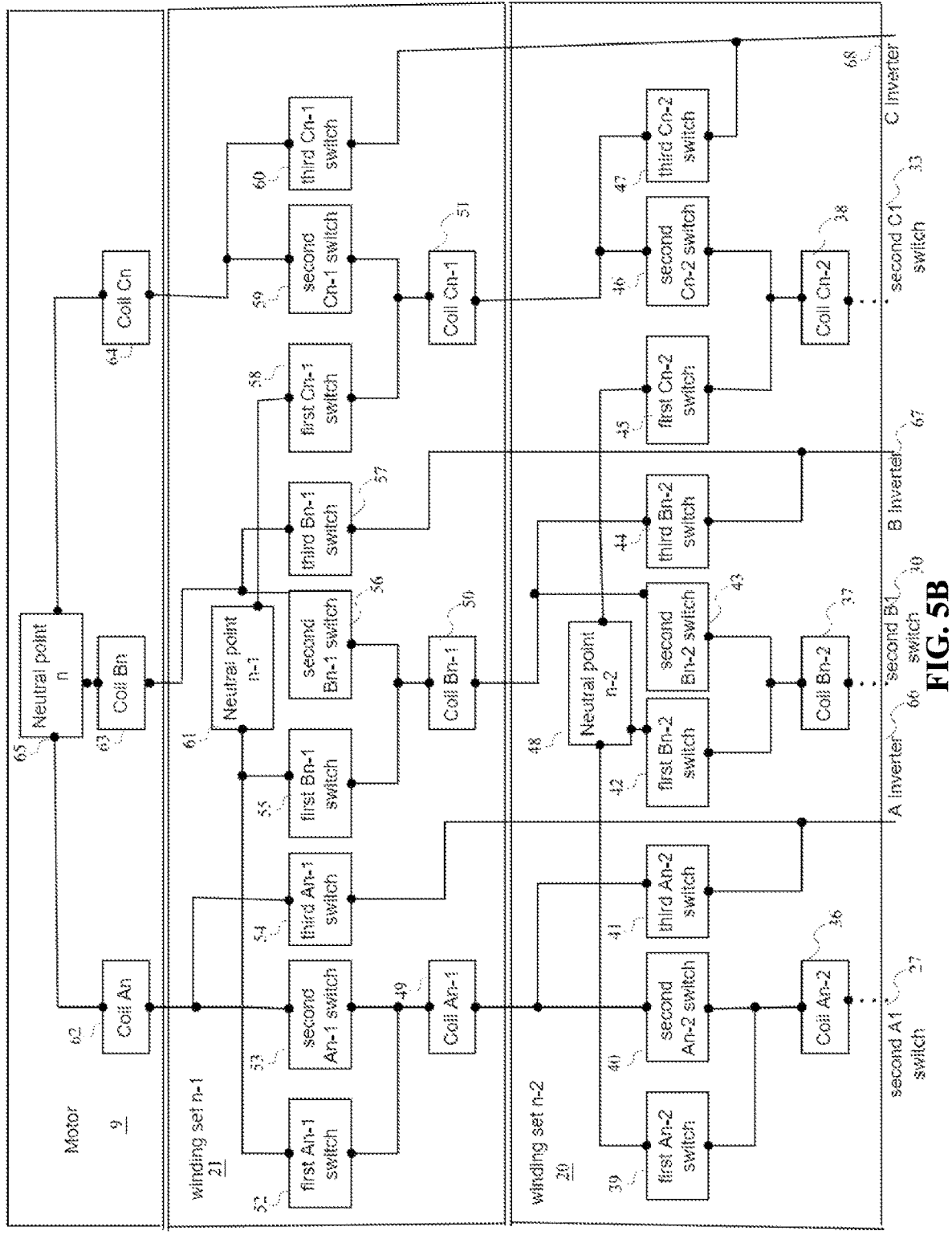
FIG. 5B is a continuation of a schematic of an electric winding exchanger system.

FIG. 5A and FIG. 5B are a schematic of n phases of an electric winding exchanger system, in accordance with some embodiments. FIG. 5B is a continuation of FIG. 5A. In FIG. 5A, winding set 1 19, coil A1 23 is connected in series to an A inverter 66, a first A1 switch 26 and a neutral point 1 35. A second A1 switch 27 and a third A1 switch 28 are connected in parallel to coil A1 23. Coil B1 29 is connected in series to a B inverter 67, a first B1 switch 29 and neutral point 1 35. A second B1 switch 30 and a third B1 switch 31 are connected in parallel to coil B1 24. Coil C1 25 is connected in series to a C inverter 68, a first C1 switch 32 and neutral point 1 35. A second C1 switch 33 and a third C1 switch 34 are connected in parallel to coil C1 25.

In FIG. 5B, winding set n−2 20, coil An−2 36 is connected in series to the second switch of An−3, a first An−2 switch 39 and a neutral point n−2 48. A second An−2 switch 40 and a third An−2 switch 41 are connected in parallel to coil An−2 36. Coil Bn−2 42 is connected in series to the second switch of An−3, a first Bn−2 switch 42 and neutral point n−2 48. A second Bn−2 switch 43 and a third Bn−2 switch 44 are connected in parallel to coil Bn−2 37. Coil Cn−2 38 is connected in series to a second switch of Cn−3, a first Cn−2 switch 45 and neutral point n−2 48. A second Cn−2 switch 46 and a third Cn−2 switch 47 are connected in parallel to coil Cn−2 38.

In winding set n−1 21, coil An−1 49 is connected in series to the second An−2 switch 40, a first An−1 switch 52 and a neutral point n−1 61. A second An−1 switch 53 and a third An−1 switch 54 are connected in parallel to coil An−1 49. Coil Bn−1 50 is connected in series to the second An−2 switch 40, a first Bn−1 switch 54 and neutral point n−1 61. A second Bn−1 switch 56 and a third Bn−1 switch 57 are connected in parallel to coil Bn−2 43. Coil Cn−1 51 is connected in series to the second Cn−2 switch 46, a first Cn−1 switch 58 and neutral point n−1 61. A second Cn−1 switch 59 and a third Cn−1 switch 60 are connected in parallel to coil Cn−1 51.

In motor 9 Coil An 62 is connected serially to the second An−1 switch 53 and neutral point n 65. Coil Bn 63 is connected serially to the second Bn−1 switch 57 and neutral point n 65. Coil Cn 64 is connected serially to the second Cn−1 switch 59 and neutral point n 65.

Neutral point 1 35, . . . neutral point n−2 48, neutral point n−1 61, and neutral point n 65 may be isolated neutral points. The electric motor 9 may be in a high torque state, a high-speed state, a transient state, or a disconnected state. The switches are controlled switches.

A plurality of first switches comprises the first A1 switch 26, . . . the first An−2 switch 39, the first An−1 switch 52, the first B1 switch 29, . . . the first Bn−2 switch 42, the first Bn−1 switch 55, the first C1 switch 25, . . . the first Cn−2 switch 45, and the first Cn−1 switch 58.

A plurality of second switches comprises the second A1 switch 27, . . . the second An−2 switch 40, the second An−1 switch 53, the second B1 switch 30, . . . the second Bn−2 switch 42, the second Bn−1 switch 56, . . . the second C1 switch 33, the second Cn−2 switch 45, and the second Cn−1 switch 59.

A plurality of third switches comprises the third A1 switch 28, . . . the third An−2 switch 41, the third An−1 switch 54, the third B1 switch 31, . . . the third Bn−2 switch 44, the third Bn−1 switch 57, the third C1 switch 34, . . . the third Cn−2 switch 47, and the third Cn−1 switch 60.

When the first A1 switch 26, . . . the first An−2 switch 39, and the first An−1 switch 52 are electrically open, and the second A1 switch 27, . . . the second An−2 switch 40, and the second An−1 switch 53 are electrically closed, and the third A1 switch 28, . . . the third An−2 switch 41, and the third An−1 switch 54 are electrically open, the coil A1 23 is in series with . . . coil An−2 36, coil An−1 49 and coil An 62. When the first B1 switch 29, . . . the first Bn−2 switch 42, and the first Bn−1 switch 55 are electrically open, and the second B1 switch 30, . . . the second Bn−2 switch 42, and the second Bn−1 switch 56 are electrically closed, and the third B1 switch 31, . . . the third Bn−2 switch 44, and the third Bn−1 switch 57 are electrically open, the coil B1 24 is in series with . . . coil Bn−2 37, coil Bn−1 50 and coil Bn 63. When the first C1 switch 25, . . . the first Cn−2 switch 45, and the first Cn−1 switch 58 are electrically open, and the second C1 switch 33, . . . the second Cn−2 switch 45, and the second Cn−1 switch 59 are electrically closed, and the third C1 switch 34, . . . the third Cn−2 switch 47, and the third Cn−1 switch 60 are electrically open, the coil C1 25 is in series with . . . coil Cn−2 38, coil Cn−1 51 and coil An 64. The electric winding system is in a high torque state. A series wired motor will deliver more stall torque, but torque drops quickly as speed increases. Series winding has the advantages of decreased motor heating for a fixed voltage drive, and decreased power draw for a fixed voltage drive. Series winding has the disadvantages of decreased output torque for fixed voltage drive and decreased speed range due to a large time constant.

When the first A1 switch 26, . . . the first An−2 switch 39, and the first An−1 switch 52 are electrically closed, and the second A1 switch 27, . . . the second An−2 switch 40, and the second An−1 switch 53 are electrically open, and the third A1 switch 28, . . . the third An−2 switch 41, and the third An−1 switch 54 are electrically closed, the coil A1 23 is in parallel with . . . coil An−2 36, coil An−1 49 and coil An 62. When the first B1 switch 29, . . . the first Bn−2 switch 42, and the first Bn−1 switch 55 are electrically closed, and the second B1 switch 30, . . . the second Bn−2 switch 42, and the second Bn−1 switch 56 are electrically open, and the third B1 switch 31, . . . the third Bn−2 switch 44, and the third Bn−1 switch 57 are electrically closed, the coil B1 24 is in parallel with . . . coil Bn−2 37, coil Bn−1 50 and coil Bn 63. When the first C1 switch 25, . . . the first Cn−2 switch 45, and the first Cn−1 switch 58 are electrically closed, and the second C1 switch 33, . . . the second Cn−2 switch 45, and the second Cn−1 switch 59 are electrically open, and the third C1 switch 34, . . . the third Cn−2 switch 47, and the third Cn−1 switch 60 are electrically closed, the coil C1 25 is in parallel with . . . coil Cn−2 38, coil Cn−1 51 and coil An 64. Parallel coils allow a lower torque with a higher speed.

When the first A1 switch 26, the first B1 switch 29, and the first C1 switch 32 are in an electrically closed state and the second A1 switch 27, the second B1 switch 30, and the second C1 switch 33 are in an electrically open state, and the third A1 switch 28, the third B1 switch 31, and the third C1 switch 34 are in an electrically open state, the winding set 1 19 acts in isolation and is in a high speed state . . . . When the first An−2 switch 39, the first Bn−2 switch 42, and the first Cn−2 switch 45 are in an electrically closed state and the second An−2 switch 40, the second Bn−2 switch 43, and the second Cn−2 switch 45 are in an electrically open state, and the third An−2 switch 41, the third Bn−2 switch 44, and the third Cn−2 switch 47 are in an electrically open state, the winding set n−2 20 acts in isolation and is in a high speed state. When the first An−1 switch 52, the first Bn−1 switch 55, and the first Cn−1 switch 58 are in an electrically closed state and the second An−1 switch 53, the second Bn−2 switch 56, and the second Cn−2 switch 59 are in an electrically open state, and the third An−1 switch 54, the third Bn−1 switch 57, and the third Cn−1 switch 60 are in an electrically open state, the winding set n−1 21 acts in isolation and is in a high speed state.

The present invention can be used to switch the electric motor 9 to a transient state. The transient state is the intermediate state of the electric motor 9 where the electric motor 9 switches between one state to another. In a transient state, the first A1 switch 26, . . . the first An−2 switch 39, and the first An−1 switch 52 are electrically closed, and the second A1 switch 27, . . . the second An−2 switch 40, and the second An–1 switch 53 are electrically closed, and the third A1 switch 28, . . . the third An–2 switch 41, and the third An–1 switch 54 are electrically open. When the first B1 switch 29, . . . the first Bn–2 switch 42, and the first Bn–1 switch 55 are electrically closed, and the second B1 switch 30, . . . the second Bn–2 switch 42, and the second Bn–1 switch 56 are electrically closed, and the third B1 switch 31, the third Bn–2 switch 44, and the third Bn–1 switch 57 are electrically open, the coil B1 24, . . . Bn–2 37, coil Bn–1 50 and coil Bn 63 are in a transient state. When the first C1 switch 25, . . . the first Cn–2 switch 45, and the first Cn–1 switch 58 are electrically closed, and the second C1 switch 33, . . . the second Cn–2 switch 45, and the second Cn–1 switch 59 are electrically closed, and the third C1 switch 34, . . . the third Cn–2 switch 47, and the third Cn–1 switch 60 are electrically open, the coil C1 25, Cn–2 38, coil Cn–1 51 and coil An 64 are in a transient state.

In another transient state, when the first A1 switch 26, . . . the first An–2 switch 39, and the first An–1 switch 52 are electrically open, and the second A1 switch 27, . . . the second An–2 switch 40, and the second An–1 switch 53 are electrically closed, and the third A1 switch 28, . . . the third An–2 switch 41, and the third An–1 switch 54 are electrically closed, the coil A1 23, . . . coil An–2 36, coil An–1 49 and coil An 62 are in a transient state. When the first B1 switch 29, . . . the first Bn–2 switch 42, and the first Bn–1 switch 55 are electrically open, and the second B1 switch 30, . . . the second Bn–2 switch 42, and the second Bn–1 switch 56 are electrically closed, and the third B1 switch 31, . . . the third Bn–2 switch 44, and the third Bn–1 switch 57 are electrically closed, the coil B1 24, coil Bn–2 37, coil Bn–1 50 and coil Bn 63 are in a transient state. When the first C1 switch 25, . . . the first Cn–2 switch 45, and the first Cn–1 switch 58 are electrically open, and the second C1 switch 33, . . . the second Cn–2 switch 45, and the second Cn–1 switch 59 are electrically closed, and the third C1 switch 34, . . . the third Cn–2 switch 47, and the third Cn–1 switch 60 are electrically closed, the coil C1 25, . . . coil Cn–2 38, coil Cn–1 51 and coil An 64 are in a transient state.

When the first A1 switch 26, . . . the first An–2 switch 39, and the first An–1 switch 52 are electrically open, and the second A1 switch 27, . . . the second An–2 switch 40, and the second An–1 switch 53 are electrically open, and the third A1 switch 28, . . . the third An–2 switch 41, and the third An–1 switch 54 are electrically open, the coil A1 23, . . . coil An–2 36, coil An–1 49 and coil An 62 are in a disconnected state. When the first B1 switch 29, . . . the first Bn–2 switch 42, and the first Bn–1 switch 55 are electrically open, and the second B1 switch 30, . . . the second Bn–2 switch 42, and the second Bn–1 switch 56 are electrically open, and the third B1 switch 31, . . . the third Bn–2 switch 44, and the third Bn–1 switch 57 are electrically open, the coil B1 24, coil Bn–2 37, coil Bn–1 50 and coil Bn 63 are in a disconnected state. When the first C1 switch 25, . . . the first Cn–2 switch 45, and the first Cn–1 switch 58 are electrically open, and the second C1 switch 33, . . . the second Cn–2 switch 45, and the second Cn–1 switch 59 are electrically open, and the third C1 switch 34, . . . the third Cn–2 switch 47, and the third Cn–1 switch 60 are electrically open, the coil C1 25, . . . coil Cn–2 38, coil Cn–1 51 and coil An 64 are in a disconnected state. In other words, when all switches 26, 27, 28, 29, 30, 31, 32, 33, 34, 39, 40, 41, 42, 43, 44, 45, 46, 47, 52, 53, 54, 55, 56, 57, 58, 59, 60 are electrically in an electrically open state, the electric winding exchanger system is in a disconnected state.

When the first A1 switch 26, . . . the first An–2 switch 39, and the first An–1 switch 52 are electrically open, and the second A1 switch 27, . . . the second An–2 switch 40, and the second An–1 switch 53 are electrically open, and the third A1 switch 28, . . . the third An–2 switch 41, and the third An–1 switch 54 are electrically closed, the coil A1 23, . . . coil An–2 36, and coil An–1 49 are in a disconnected state. When the first B1 switch 29, . . . the first Bn–2 switch 42, and the first Bn–1 switch 55 are electrically open, and the second B1 switch 30, . . . the second Bn–2 switch 42, and the second Bn–1 switch 56 are electrically open, and the third B1 switch 31, . . . the third Bn–2 switch 44, and the third Bn–1 switch 57 are electrically closed, the coil B1 24, coil Bn–2 37, and coil Bn–1 50 are in a disconnected state. When the first C1 switch 25, . . . the first Cn–2 switch 45, and the first Cn–1 switch 58 are electrically open, and the second C1 switch 33, . . . the second Cn–2 switch 45, and the second Cn–1 switch 59 are electrically open, and the third C1 switch 34, . . . the third Cn–2 switch 47, and the third Cn–1 switch 60 are electrically closed, the coil C1 25, . . . coil Cn–2 38, and coil Cn–1 51 are in a disconnected state. The electric winding exchanger system is off but the motor in winding set n 65 is operational.

Figure 6:
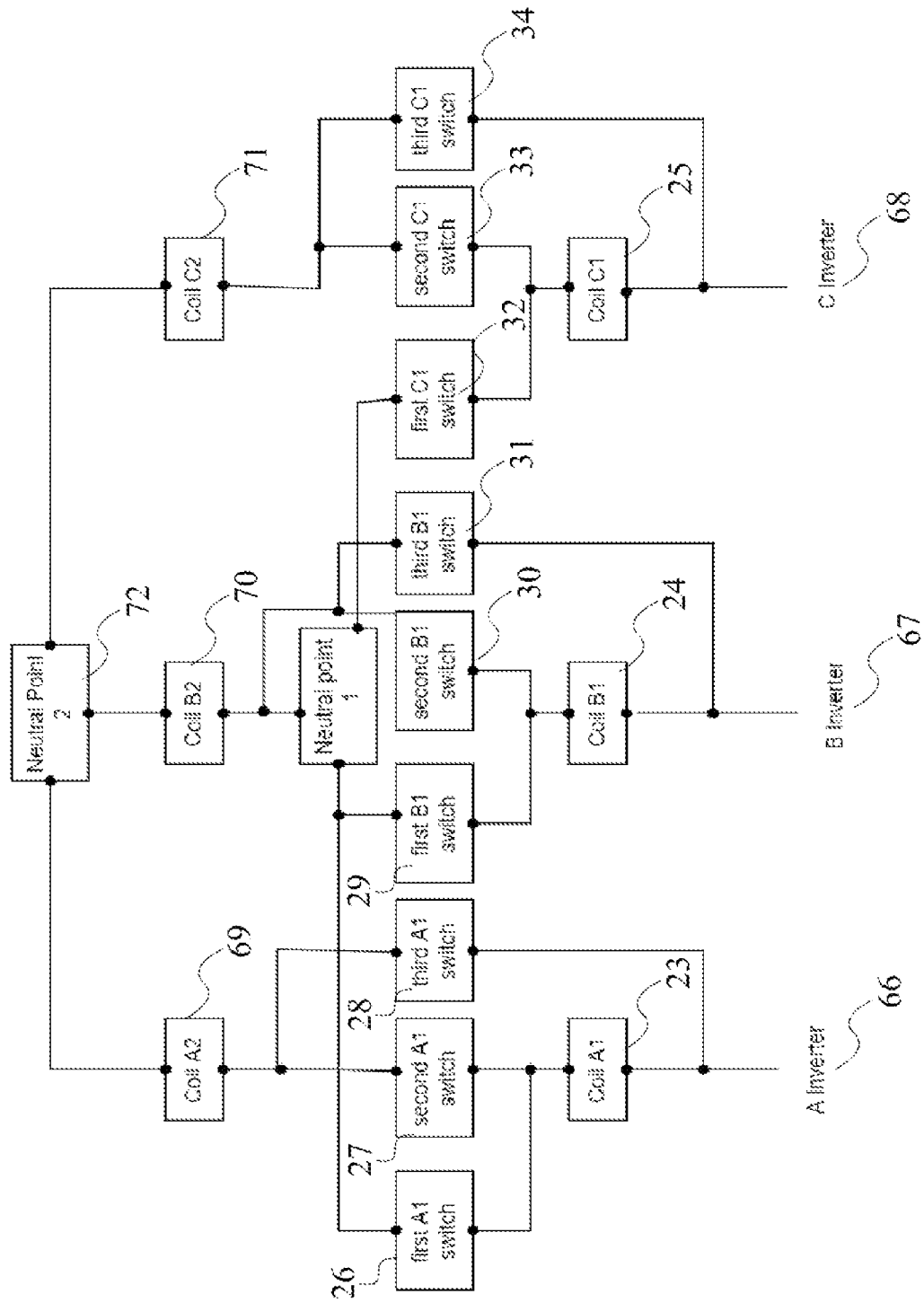
FIG. 6 is a schematic of an electric winding exchanger system for a multi-phase electric motor with two isolated neutrals and multiple coil paths.

FIG. 6 is a schematic of an electric winding exchanger system. Coil A1 23 is connected in series to an A inverter 66, a first A1 switch 26 and a neutral point 1 35. A second A1 switch 27 and a third A1 switch 28 are connected in parallel to coil A1 23. Coil B1 29 is connected in series to a B inverter 67, a first B1 switch 29 and neutral point 1 35. A second B1 switch 30 and a third B1 switch 31 are connected in parallel to coil B1 24. Coil C1 25 is connected in series to a C inverter 68, a first C1 switch 32 and neutral point 1 35. A second C1 switch 33 and a third C1 switch 34 are connected in parallel to coil C1 25. Coil A2 62 is connected serially to the second A1 switch 27 and neutral point 2 72. Coil Bn 63 is connected serially to the second B1 switch 30 and neutral point 2 72. Coil C2 71 is connected serially to the second C1 switch 33 and neutral point 2 72.

When the first A1 switch 26, the first B1 switch 29, and the first C1 switch 32 are electrically closed, the second A1 switch 27, the second B1 switch 30, and the second C1 switch 33 are electrically open, and the third A1 switch 28, the third B1 switch 31, and the third C1 switch 34 are electrically closed, the coils are in a parallel state and both neutrals are isolated. This state achieves lower torque with a higher speed.

When the first A1 switch 26, the first B1 switch 29, and the first C1 switch 32 are electrically open, the second A1 switch 27, the second B1 switch 30, and the second C1 switch 33 are electrically closed, and the third A1 switch 28, the third B1 switch 31, and the third C1 switch 34 are electrically open, the coils are in series and there is one isolated neutral. This state achieves a high torque.

When the first A1 switch 26, the first B1 switch 29, and the first C1 switch 32 are electrically closed, the second A1 switch 27, the second B1 switch 30, and the second C1 switch 33 are electrically closed, and the third A1 switch 28, the third B1 switch 31, and the third C1 switch 34 are electrically open, the coils are in a transient state and both neutrals are isolated.

When the first A1 switch 26, the first B1 switch 29, and the first C1 switch 32 are electrically open, the second A1 switch 27, the second B1 switch 30, and the second C1 switch 33 are electrically closed, and the third A1 switch 28, the third B1 switch 31, and the third C1 switch 34 are electrically closed, the coils are in a transient state and there is one isolated neutral.

When the first A1 switch 26, the first B1 switch 29, and the first C1 switch 32 are electrically open, the second A1 switch 27, the second B1 switch 30, and the second C1 switch 33 are electrically open, and the third A1 switch 28, the third B1 switch 31, and the third C1 switch 34 are electrically closed, the electric winding exchanger system is off and only the motor, i.e., coil A2 69, coil B2 70, and coil C2 71 are connected to the respective inverters and neutral point 2 72.

Figure 7:
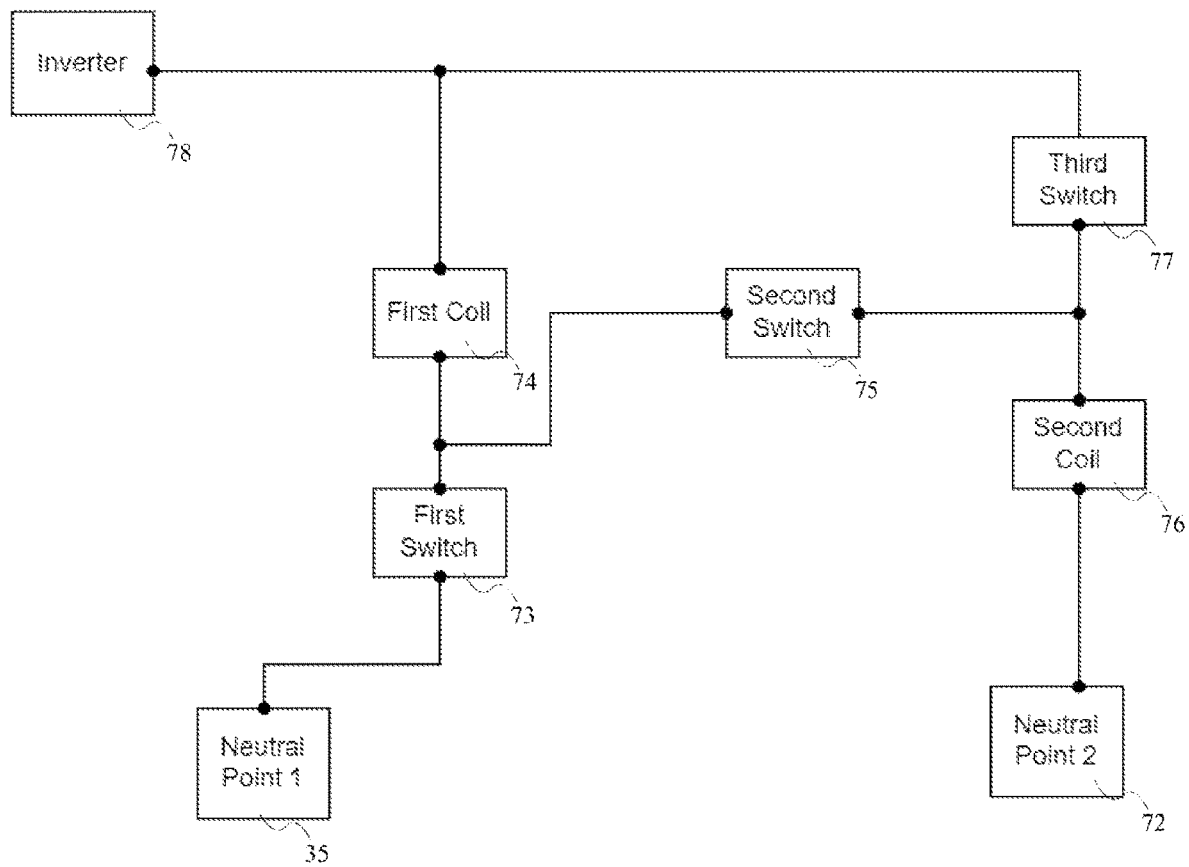
FIG. 7 is a schematic of an electric winding exchanger system for a single phase of an electric motor with two isolated neutrals and two coils set.

FIG. 7 is a schematic of one phase of an electric winding exchanger system, in accordance with some embodiments. A first coil is connected in series to a first Switch and a first isolated neutral. A second switch and a third switch are connected in parallel to the first coil. A second coil is connected in series to a second isolated neutral at a point between the second switch and the third switch. An inverter is connected to a point between the first coil and the third switch. In the event that the second switch is in an on position and the first switch and the third switch are in an off position, the first coil is in series with the second coil. In the event that the third switch is in an on position and the first switch is in an on position and the second switch is in an off position then the first coil is in parallel with the second coil. When the first coil and the second coil are in series the torque is doubled without demanding more current. When the first coil and the second coil are in parallel speed can be higher without exceeding the limits of a direct current voltage of the inverter. In the event that the third switch is off, the second switch is off, and the third switch is off, the electric winding exchanger system is in an off state and the inverter is fully disconnected from the inverter. This allows overcoming the limits in design of the motor line back EMF at high speed under no-load and no-flux weakening conditions.

Figure 8:
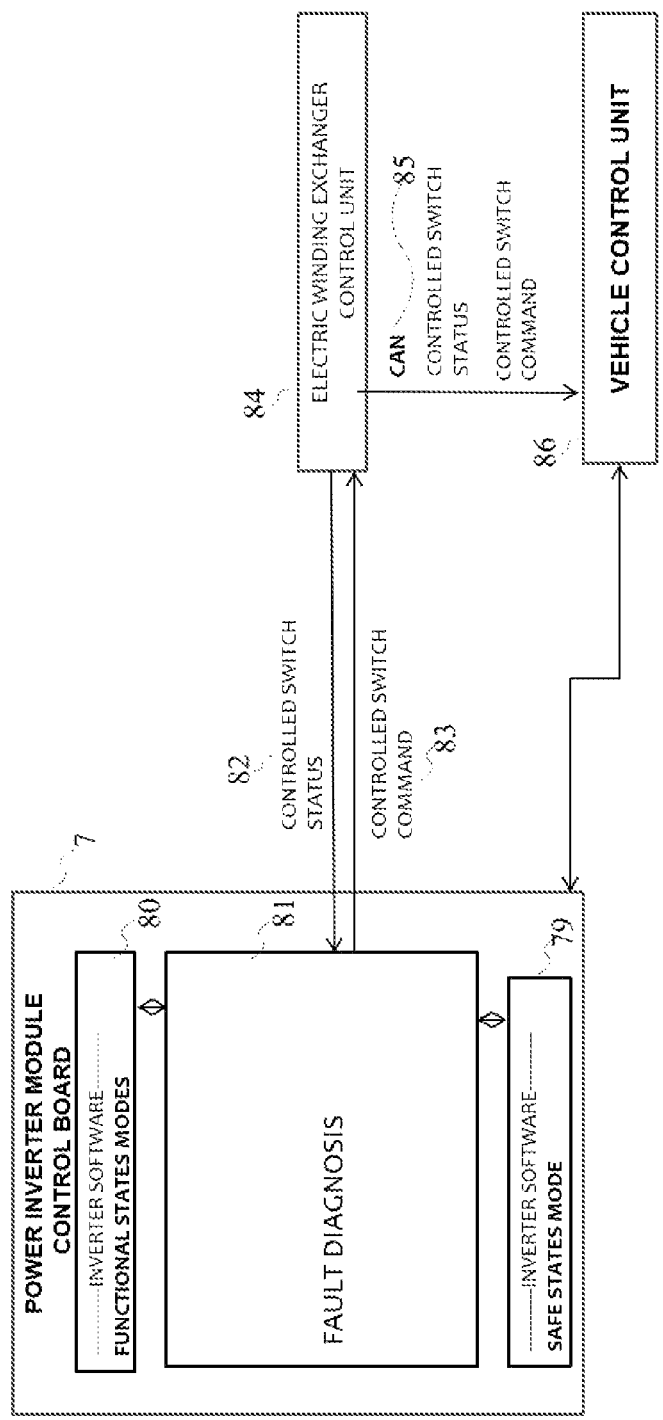
FIG. 8 is a diagram of a software unit commanding controlled switches.

FIG. 8 is the software unit commanding controlled switches. A power inverter module control board contains inverter software which determines functional state modes such as high torque, high speed, transient, and off. In the event of a fault diagnosis 81, the electric winding exchanger control unit communicates a controlled switch command 83 to the electric winding exchanger control unit 84 and receives a controlled switch status 82 from the electric winding exchanger control unit 84. The electric winding exchanger control unit 84 sends controlled switch status 82 and controlled switch command 83 via a controlled area network (CAN) 85 to the vehicle control unit 86. The vehicle control unit sends signals back and forth to the power inverter module control board 7.

Figure 9:
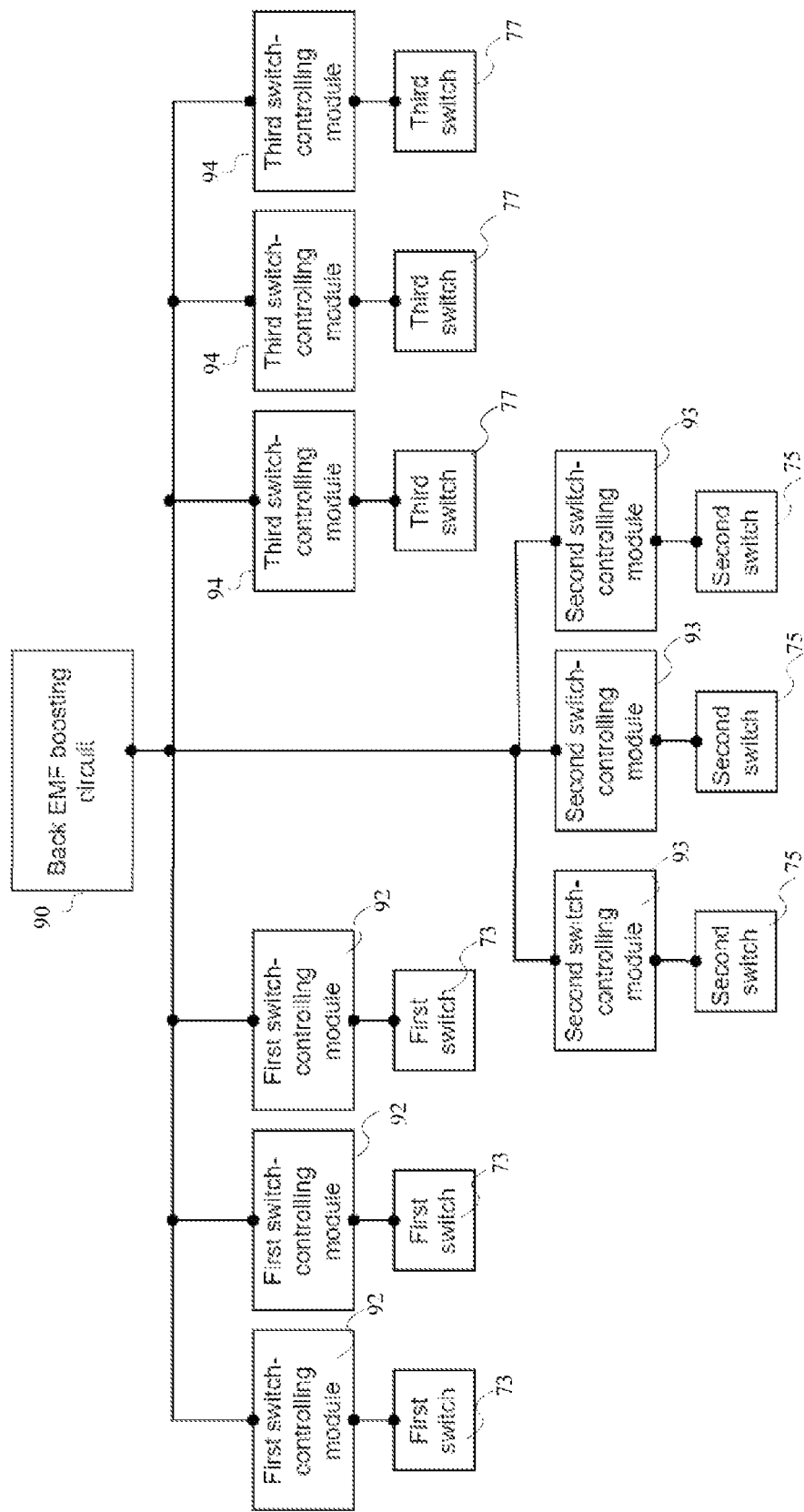
FIG. 9 is a schematic diagram illustrating the electrical and electronic connections between the back EMF boosting circuit and a plurality of first switches, a plurality of second switches, and a plurality of third switches for an electric motor with two isolated neutral and two coil set shown in FIG. 7.

FIG. 9 is a schematic diagram illustrating the electrical and electronic connections between the back EMF boosting circuit and a plurality of first switches, a plurality of second switches, and a plurality of third switches. The back EMF boosting circuit 90 is connected to a plurality of first switch controlling modules 92 which connect to a plurality of first switches 73. The back EMF boosting circuit 90 is connected to a plurality of second switch controlling modules 93 which connect to a plurality of second switches 75. The back EMF boosting circuit 90 is connected to a plurality of third switch controlling modules 994 which connect to a plurality of third switches 77. The first switch controlling modules 92 control whether the first switches 73 are in an electrically open or closed state. The second switch controlling modules 93 control whether the second switches 75 are in an electrically open or closed state. The third switch controlling modules 94 control whether the third switches 74 are in an electrically open or closed state. This allows commands to be relayed from the electric winding exchanger control unit 84 to each of the first switch-controlling modules 92, each of the second switch-controlling modules 93, and each of the third switch-controlling modules 94. In alternative embodiments, a single first switch-controlling module may control all of the first switches 73, a single second switch-controlling module may control all of the second switches 75, and a single third switch-controlling module may control all of the third switches 77.

Figure 10:
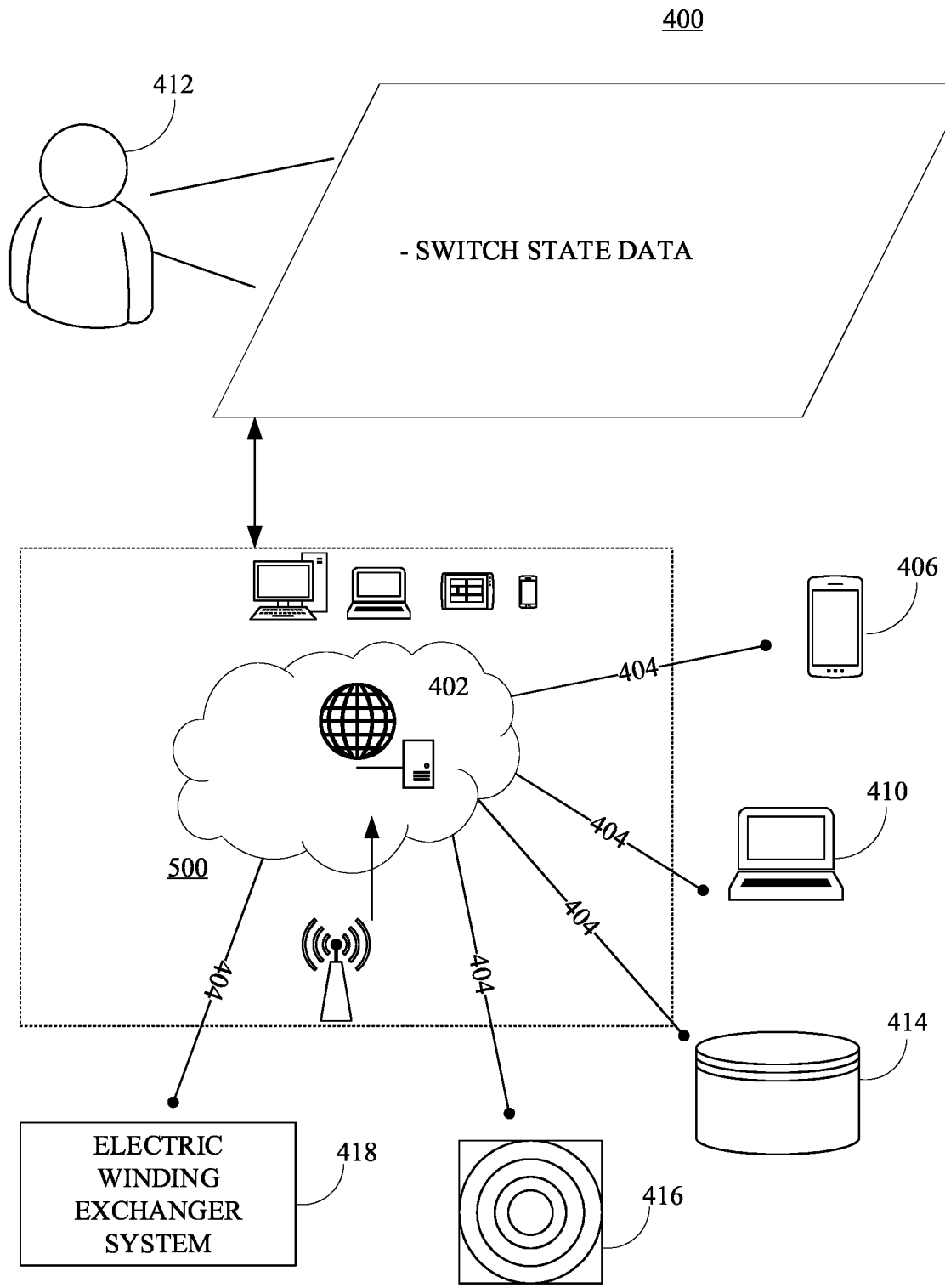
FIG. 10 is an illustration of an online platform consistent with various embodiments of the present disclosure.

FIG. 10 is an illustration of an online platform 400 consistent with various embodiments of the present disclosure. By way of non-limiting example, the online platform 400 to manage an electric winding exchanger system may be hosted on a centralized server 402, such as, for example, a cloud computing service. The centralized server 402 may communicate with other network entities, such as, for example, a mobile device 406 (such as a smartphone, a laptop, a tablet computer, etc.), other electronic devices 410 (such as desktop computers, server computers, etc.), databases 414, sensors 416, actuators (not shown) and an electric winding exchanger system 418 over a communication network 404, such as, but not limited to, the Internet. Further, users of the online platform 400 may include relevant parties such as, but not limited to, end-users and administrators. Accordingly, in some instances, electronic devices operated by the one or more relevant parties may be in communication with the online platform 400.

A user 412, such as the one or more relevant parties, may access the online platform 400 through a web-based software application or browser. The web-based software application may be embodied as, for example, but not be limited to, a website, a web application, a desktop application, and a mobile application compatible with a computing device 500.

The sensors 416 may include a switch sensor. The switch sensor may be configured for generating switch state data of the controlled switches based on detecting a switching state of the controlled switches. The online platform 400 (server computer) may include a communication device. The communication device may be configured for transmitting the switch state data to at least one user device.

With reference to FIG. 10, a system consistent with an embodiment of the disclosure may include a computing device or cloud service, such as computing device 500. In a basic configuration, computing device 500 may include at least one processing unit 502 and a system memory 504. Depending on the configuration and type of computing device, system memory 504 may comprise, but is not limited to, volatile (e.g., random-access memory (RAM)), non-volatile (e.g., read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include machine learning module. Furthermore, embodiments of the disclosure may be practiced in conjunction with a graphics library, other operating systems, or any other application program and is not limited to any particular application or system. This basic configuration is illustrated in FIG. 10 by those components within a dashed line 508.

Figure 11:
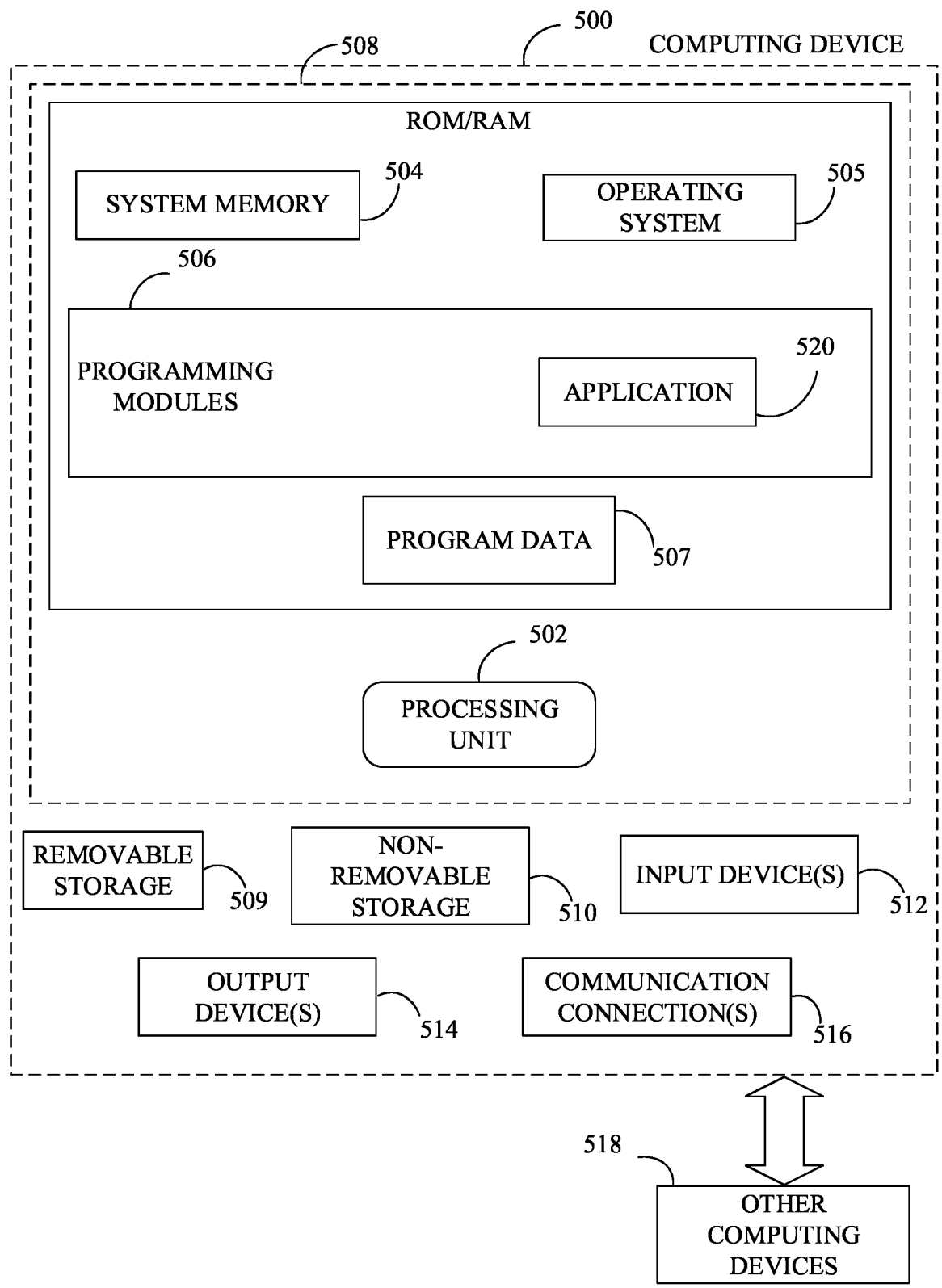
FIG. 11 is a block diagram of a computing device for implementing the methods disclosed herein, in accordance with some embodiments.

Computing device 500 may have additional features or functionality. For example, computing device 500 may also include additional data storage devices (removable and/or non-removable) such as, for example, magnetic disks, optical disks, or tape. Such additional storage is illustrated in FIG. 11 by a removable storage 509 and a non-removable storage 510. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, a location sensor, a camera, a biometric sensor, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 504, including operating system 505. While executing on processing unit 502, programming modules 506 (e.g., application 520 such as a media player) may perform processes including, for example, one or more stages of methods, algorithms, systems, applications, servers, databases as described above. The aforementioned process is an example, and processing unit 502 may perform other processes. Other programming modules that may be used in accordance with embodiments of the present disclosure may include machine learning application, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Supplemental Description

The following detailed description is merely exemplary in nature and is not intended to limit the present disclosure or the application and uses of the present disclosure. Furthermore, there is no intention to be bound by any theory presented in the preceding background or the following detailed description.

In multi-phase electric motors such as 3-phase electric motor, a torque-speed profile has a constant torque region and a constant power region, the Torque is proportional to the following equation at a constant mechanical speed of $\omega_m$.

$$T \propto \frac{E \times I}{\omega_m} \quad \text{(Eq. 1)}$$

... where E is the back EMF, I is the input current [A], and $\omega_m$ is the mechanical speed. In multi-phase Permanent magnet motor the equation is further expanded to:

$$T \propto \frac{K_{pm} \times \omega_e \times N_s \times N_p \times \frac{I}{N_p}}{\omega_m} \quad \text{(Eq. 2)}$$

... where $K_{pm}$ is a constant and depends on the motor airgap flux density in [Tesla], $\omega_e$ is the radian frequency of rotating magnetic field [rad/sec], and $N_s$ is the total number of series coils in a winding-set and $N_p$ is the number of winding-set in the motor (parallel paths). It is mentioned that we might have up to several winding sets each having $I/N_p$ [Amps]. $I/N_p$ directly affects the thermal performance of the motor.

Using the electric winding exchanger system between an electric motor 9 and a motor control unit, the winding pattern of the electric motor 9 is reconfigured in order to change the back EMF in real time for converting a normal torque profile to a high-torque profile or a high-speed profile. The back EMF boosting is done by changing the ratio of $N_s$ and $N_p$. This is done by automatic reconfiguration of motor winding during operation in real-time using the electric winding exchanger. In other words, the total series Amp turn of the motor $N_s \times I$, can be doubled, tripled, or other multiple resulting in the doubled, tripled, and multiple torque ratios. This needs to be done with certain consideration of the thermal duration limits. Similarly, in multi-phase induction motors, the equation is further expanded to:

$$T \propto \frac{K_{IN} \times I \times \omega_e \times N_s \times N_p \times \frac{I}{N_p}}{\omega_m} \quad \text{(Eq. 3)}$$

The total series Amp turn of the motor $N_s \times I$, can be doubled, tripled, or other multiple resulting in the doubled, tripled, and multiple torque ratios. Table 1 shows a typical electric motor winding pattern reconfiguration i.e. $N_p$ versus $N_s$ during the electric winding exchanger operation. For example for an electric motor 9 with two parallel winding set, normal torque will be converted to high torque profile by changing $N_s$ from $K_2$ to $2K_2$ and by changing $N_p$ from $K_1$ to $K_1/2$. This is done without the need for extra current [Amps] from the motor control unit. It is mentioned that in the electrical motor 7, the phase resistance of the electric motor 9 should be small enough (at least $$R < \frac{\frac{VDC}{2\sqrt{2}} - E_{ph-n}}{N \times \max(I)})$$

so that the peak current of the electric motor 9 does not significantly change when $N_s$ or corresponding electric motor resistance is increasing. $E_{ph-n}$ is the RMS of phase-neutral back EMF. In this case an increase in $E_{an}$ is always higher than decrease in max(I) and the power of the electric motor 9 increases.

TABLE 1

Configuration table of electric winding exchanger for achieving different ratio of torque profile

| $\text{Max}\frac{T(n \cdot M)}{I(A)}$ @ constant torque region | $T_m$ | $2T_m$ | $3T_m$ | ... | $NT_m$ |
|---|---|---|---|---|---|
| $N_s$ | $K_2$ | $2K_2$ | $3K_2$ | ... | $NK_2$ |
| $N_p$ | $K_1$ | $K_1/2$ | $K_1/3$ | ... | $K_1/N$ |
| $\text{Max}\frac{\omega_m(RPM)}{VDC(V)}$ @ constant Power region | $\omega_m$ | $\frac{\omega_m}{2}$ | $\frac{\omega_m}{3}$ | ... | $\frac{\omega_m}{N}$ |
| $N_s$ | $K_2$ | $2K_2$ | $3K_2$ | ... | $NK_2$ |
| $N_p$ | $K_1$ | $K_1/2$ | $K_1/3$ | ... | $K_1/N$ |

Table 2 shows another typical electric motor winding pattern reconfiguration i.e. $N_p$ versus $N_s$ during the electric winding exchanger operation. For example for an electric motor 9 with two parallel coils, normal torque is converted to low torque profile by changing $N_s$ from $K_2$ to $K_2/2$ and by changing $N_p$ from $K_1$ to $2K_1$. This is done without excessive the need for voltage from electric high-voltage DC bus.

TABLE 2

Configuration table of electric winding exchanger for achieving wide-torque speed range

| $\text{Max}\frac{T(N \cdot m)}{\max I(A)}$ @ constant torque region | $T_m$ | $T_m/2$ | $T_m/3$ | ... | $T_m/N$ |
|---|---|---|---|---|---|
| $N_s$ | $K_2$ | $K_2/2$ | $K_2/3$ | ... | $K_2/N$ |
| $N_p$ | $K_1$ | $2K_1$ | $3K_1$ | ... | $NK_1$ |
| $\text{Max}\frac{\omega_m(RPM)}{VDC(V)}$ @ constant Power region | $\omega_m$ | $2\omega_m$ | $3\omega_m$ | ... | $N\omega_m$ |
| $N_s$ | $K_2$ | $K_2/2$ | $K_2/3$ | ... | $K_2/N$ |
| $N_p$ | $K_1$ | $2K_1$ | $3K_1$ | ... | $NK_1$ |

Although the invention has been explained in relation to its preferred embodiment, it is to be understood that many other possible modifications and variations can be made without departing from the spirit and scope of the invention as hereinafter claimed.

What is claimed is:

1. An electric winding exchanger system comprises:
   an electronic control unit;
   a back electromotive force (EMF) boosting circuit;
   a plurality of high-voltage terminals;
   an electric motor;
   a motor control unit;
   a plurality of winding sets;
   each of the plurality of winding sets comprises a plurality of coils and a corresponding neutral point;
   the motor control unit being electrically connected to the electronic control unit;
   the electronic control unit being electrically connected to the back EMF boosting circuit;
   the electric winding exchanger system being configured to operate through a plurality of electrical phases, wherein each of the plurality of electrical phases is associated to a corresponding high-voltage terminal from the plurality of high-voltage terminals and a corresponding coil from the plurality of coils;
   each of the corresponding neutral points being selectively and electrically connected to each of the plurality of coils; and
   the corresponding coil being selectively and electrically connected to the back EMF boosting circuit by the corresponding high-voltage terminal.

2. The electric winding exchanger system as claimed in claim 1 comprises:
   a plurality of first switches;
   the corresponding neutral point being electrically connected to the corresponding coils by a corresponding first switch from the plurality of first switches;
   the back EMF boosting circuit being electrically connected to each of the plurality of first switches;
   a plurality of second switches;
   the corresponding coil being electrically connected to the corresponding high-voltage terminal by a corresponding second switch from the plurality of second switches;
   the back EMF boosting circuit being electrically connected to each of the plurality of second switches;
   a plurality of third switches;
   the corresponding coil for a winding set being electrically connected to the corresponding coil for a next winding set by a corresponding third switch from the plurality of third switches; and
   the back EMF boosting circuit being electrically connected to each of the plurality of third switches.

3. The electric winding exchanger system as claimed in claim 2 comprises:
   the back EMF boosting circuit comprises a plurality of first switch-controlling modules;
   the electronic control unit being electrically connected to each of the plurality of first switch-controlling modules; and
   each of the plurality of first switch-controlling modules being electrically connected to a corresponding first switch from the plurality of first switches.

4. The electric winding exchanger system as claimed in claim 2 comprises:
   the back EMF boosting circuit comprises a plurality of second switch-controlling modules;
   the electronic control unit being electrically connected to each of the plurality of second switch-controlling modules; and
   each of the plurality of second switch-controlling modules being electrically connected to a corresponding second switch from the plurality of second switches.

5. The electric winding exchanger system as claimed in claim 2 comprises:
   the back EMF boosting circuit comprises a plurality of third switch-controlling modules;
   the electronic control unit being electrically connected to each of the plurality of third switch-controlling modules; and
   each of the plurality of third switch-controlling modules being electrically connected to a corresponding third switch from the plurality of third switches.

6. The electric winding exchanger system as claimed in claim 2 comprises:
   wherein the electric winding exchanger system is in a high speed state;
   the corresponding plurality of first switches is in an electrically closed state;
   the corresponding plurality of second switches is in an electrically open state;
   the corresponding plurality of third switches is in an electrically closed state; and
   the corresponding coils for the winding sets are electrically connected in parallel with the corresponding high-voltage terminal.

7. The electric winding exchanger system as claimed in claim 2 comprises:
   wherein the electric winding exchanger system is in a high-torque state;
   the corresponding plurality of first switches is in an electrically open state;
   the corresponding plurality of second switches is in an electrically closed state;
   the corresponding plurality of third switches is in an electrically open state; and
   the corresponding coils for the winding sets are electrically connected in series with the corresponding high-voltage terminal.

8. The electric winding exchanger system as claimed in claim 2 comprises:
   wherein the electric winding exchanger system is in a transient state;
   the corresponding plurality of first switches is in an electrically closed state;
   the corresponding plurality of second switches is in an electrically closed state;
   the corresponding plurality of third switches is in an electrically open state; and
   there is a plurality of isolated neutrals.

9. The electric winding exchanger system as claimed in claim 2 comprises:
   wherein the electric winding exchanger system is in a transient state;
   the corresponding plurality of first switches is in an electrically open state;
   the corresponding plurality of second switches is in an electrically closed state;
   the corresponding plurality of third switches is in an electrically closed state; and
   there is one isolated neutral.

10. The electric winding exchanger system as claimed in claim 2 comprises:
    wherein the electric winding exchanger system is in a disconnected state;
    the corresponding plurality of first switches is in an electrically open state;

the corresponding plurality of second switches is in an electrically open state; and the corresponding plurality of third switches is in an electrically open state.

11. An electric winding exchanger system comprises:
an electronic control unit;
a back electromotive force (EMF) boosting circuit;
a plurality of high-voltage terminals;
an electric motor;
a motor control unit;
a plurality of winding sets;
each of the plurality of winding sets comprises a plurality of coils and a corresponding neutral point;
the motor control unit being electrically connected to the electronic control unit;
the electronic control unit being electrically connected to the back EMF boosting circuit;
the electric winding exchanger system being configured to operate through a plurality of electrical phases, wherein each of the plurality of electrical phases is associated to a corresponding high-voltage terminal from the plurality of high-voltage terminals and a corresponding coil from the plurality of coils;
each of the corresponding neutral points being selectively and electrically connected to each of the plurality of coils;
the corresponding coil being selectively and electrically connected to the back EMF boosting circuit by the corresponding high-voltage terminal;
a corresponding plurality of first switches;
the corresponding neutral point being electrically connected to the corresponding coils by a corresponding first switch from the corresponding plurality of first switches;
the back EMF boosting circuit being electrically connected to each of the plurality of first switches;
a corresponding plurality of second switches;
the corresponding coil being electrically connected to the corresponding high-voltage terminal by a corresponding second switch from the corresponding plurality of second switches;
the back EMF boosting circuit being electrically connected to each of the plurality of second switches;
a corresponding plurality of third switches;
the corresponding coil for a winding set being electrically connected to the corresponding coil for a next winding set by a corresponding third switch from the plurality of third switches; and
the back EMF boosting circuit being electrically connected to each of the plurality of third switches.

12. The electric winding exchanger system as claimed in claim 11 comprises:
the back EMF boosting circuit comprises a plurality of first switch-controlling modules;
the electronic control unit being electrically connected to each of the plurality of first switch-controlling modules; and
each of the plurality of first switch-controlling modules being electrically connected to a corresponding first switch from the plurality of first switches.

13. The electric winding exchanger system as claimed in claim 11 comprises:
the back EMF boosting circuit comprises a plurality of second switch-controlling modules;
the electronic control unit being electrically connected to each of the plurality of second switch-controlling modules; and
each of the plurality of second switch-controlling modules being electrically connected to a corresponding second switch from the plurality of second switches.

14. The electric winding exchanger system as claimed in claim 11 comprises:
the back EMF boosting circuit comprises a plurality of third switch-controlling modules;
the electronic control unit being electrically connected to each of the plurality of third switch-controlling modules; and
each of the plurality of third switch-controlling modules being electrically connected to a corresponding third switch from the plurality of third switches.

15. The electric winding exchanger system as claimed in claim 11 comprises:
wherein the electric winding exchanger system is in a high speed state;
the corresponding plurality of first switches is in an electrically closed state;
the corresponding plurality of second switches is in an electrically open state;
the corresponding plurality of third switches is in an electrically closed state; and
the corresponding coils for the winding sets are electrically connected in parallel with the corresponding high-voltage terminal.

16. The electric winding exchanger system as claimed in claim 11 comprises:
wherein the electric winding exchanger system is in a high-torque state;
the corresponding plurality of first switches is in an electrically open state;
the corresponding plurality of second switches is in an electrically closed state;
the corresponding plurality of third switches is in an electrically open state; and
the corresponding coils for the winding sets are electrically connected in series with the corresponding high-voltage terminal.

17. The electric winding exchanger system as claimed in claim 11 comprises:
wherein the electric winding exchanger system is in a transient state;
the corresponding plurality of first switches is in an electrically closed state;
the corresponding plurality of second switches is in an electrically closed state;
the corresponding plurality of third switches is in an electrically open state; and
there is a plurality of isolated neutrals.

18. The electric winding exchanger system as claimed in claim 11 comprises:
wherein the electric winding exchanger system is in a transient state;
the corresponding plurality of first switches is in an electrically open state;
the corresponding plurality of second switches is in an electrically closed state;
the corresponding plurality of third switches is in an electrically closed state; and
there is one isolated neutral.

19. The electric winding exchanger system as claimed in claim 11 comprises:
wherein the electric winding exchanger system is in a disconnected state;
the corresponding plurality of first switches is in an electrically open state;

the corresponding plurality of second switches is in an electrically open state; and the corresponding plurality of third switches is in an electrically open state.

20. An electric winding exchanger system comprises:
an electronic control unit;
a back electromotive force (EMF) boosting circuit;
a plurality of high-voltage terminals;
an electric motor;
a motor control unit;
a plurality of winding sets;
each of the plurality of winding sets comprises a plurality of coils and a corresponding neutral point;
the motor control unit being electrically connected to the electronic control unit;
the electronic control unit being electrically connected to the back EMF boosting circuit;
the electric winding exchanger system being configured to operate through a plurality of electrical phases, wherein each of the plurality of electrical phases is associated to a corresponding high-voltage terminal from the plurality of high-voltage terminals and a corresponding coil from the plurality of coils;
each of the corresponding neutral points being selectively and electrically connected to each of the plurality of coils;
the corresponding coil being selectively and electrically connected to the back EMF boosting circuit by the corresponding high-voltage terminal;
a corresponding plurality of first switches;
the corresponding neutral point being electrically connected to the corresponding coils by a corresponding first switch from the corresponding plurality of first switches;
the back EMF boosting circuit being electrically connected to each of the plurality of first switches;
a corresponding plurality of second switches;
the corresponding coil being electrically connected to the corresponding high-voltage terminal by a corresponding second switch from the corresponding plurality of second switches;
the back EMF boosting circuit being electrically connected to each of the plurality of second switches;
a corresponding plurality of third switches;
the corresponding coil for a winding set being electrically connected to the corresponding coil for a next winding set by a corresponding third switch from the plurality of third switches; and
the back EMF boosting circuit being electrically connected to each of the plurality of third switches;
the back EMF boosting circuit comprises a plurality of first switch-controlling modules;
the electronic control unit being electrically connected to each of the plurality of first switch-controlling modules;
each of the plurality of first switch-controlling modules being electrically connected to a corresponding first switch from the plurality of first switches;
the back EMF boosting circuit comprises a plurality of second switch-controlling modules;
the electronic control unit being electrically connected to each of the plurality of second switch-controlling modules;
each of the plurality of second switch-controlling modules being electrically connected to a corresponding second switch from the plurality of second switches;
the back EMF boosting circuit comprises a plurality of third switch-controlling modules;
the electronic control unit being electrically connected to each of the plurality of third switch-controlling modules; and
each of the plurality of third switch-controlling modules being electrically connected to a corresponding third switch from the plurality of third switches.

* * * * *